Jan. 8, 1924.

M. BRANDT

DRY MASH FEED HOPPER

Filed June 21, 1923

1,480,497

WITNESSES
H. J. Walker
P. H. Pattison

INVENTOR
M. Brandt
BY Munn & Co.
ATTORNEYS

Patented Jan. 8, 1924.

1,480,497

UNITED STATES PATENT OFFICE.

MARTIN BRANDT, OF TOMS RIVER, NEW JERSEY.

DRY-MASH-FEED HOPPER.

Application filed June 21, 1923. Serial No. 646,895.

*To all whom it may concern:*

Be it known that I, MARTIN BRANDT, a citizen of the United States, and a resident of Toms River, in the county of Ocean and State of New Jersey, have invented a new and Improved Dry-Mash-Feed Hopper, of which the following is a full, clear, and exact description.

The present invention relates to new and useful improvements in feed hoppers for poultry and the like, and it pertains more particularly to a feed hopper especially adapted for feeding dry mash.

It is one of the primary objects of the invention to provide means for preventing the dry mash collecting in the hopper, thus insuring a sufficient quantity being present at all times in the feed trough of the device.

It is a further object of the invention to arrange an agitating means for causing the feed to be discharged from the hopper into the feed trough in such a manner that it is operated by fowl feeding from the hopper.

With the above and other objects in view, reference is had to the accompanying drawings, in which—

Figure 1:
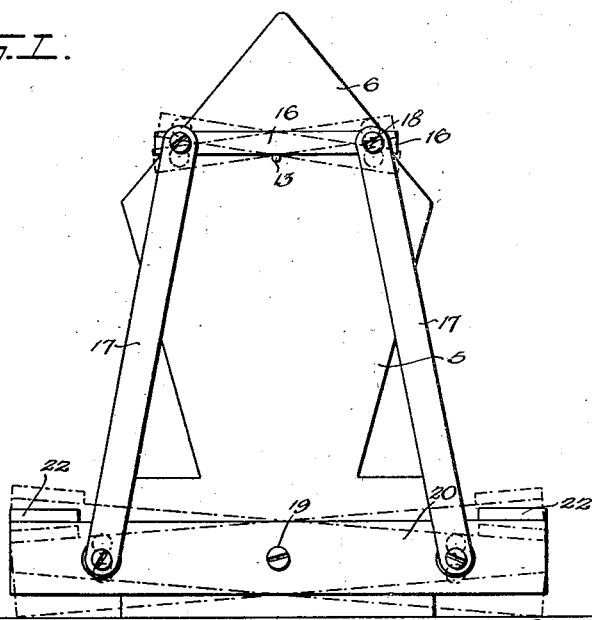
Figure 1 is a view in side elevation of a dry mash feeding hopper constructed in accordance with the present invention.
Figure 2:
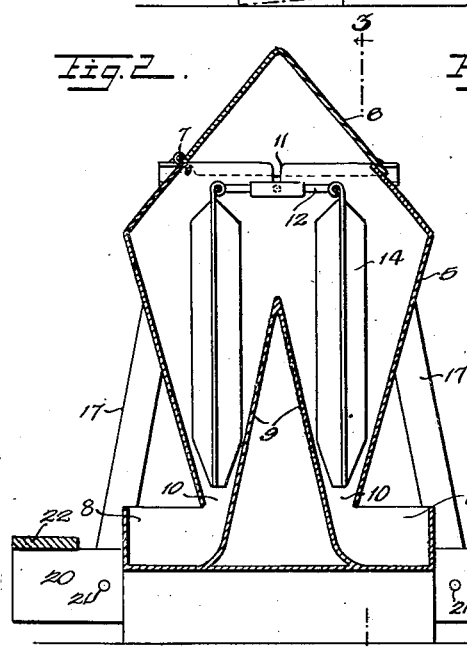
Fig. 2 is a vertical section thereof taken on the line 2—2 of Fig. 3.
Figure 3:
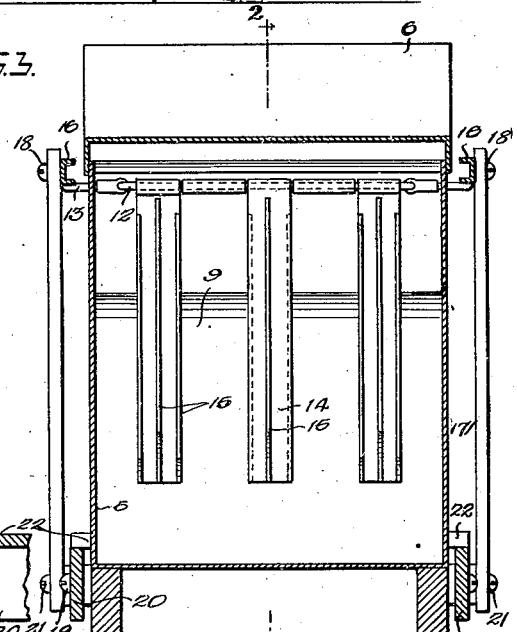
Fig. 3 is a vertical sectional view thereof taken on the line 3—3 of Fig. 2.

Referring more particularly to the drawings, the device comprises a hopper 5 having a cover 6 hinged to the hopper, as at 7, and forming means when open for filling the hopper 5 with feed. The hopper 5 has two feed troughs 8, and a central hollow partition 9 is employed whereby the feed troughs are separated from each other, two discharge openings from the hopper to the feed troughs being provided. The upper edge of the end walls of the hopper are each provided with a notch 11, the purpose of which will be hereinafter described.

The reference character 12 designates a rectangular frame mounted in the upper portion of the hopper, and having a trunnion 13 at each end thereof. These trunnions 13 are adapted to be received in the notches 11 of the end walls of the hopper to provide means for pivotally mounting the rectangular frame in the upper portion of the hopper 5.

Pivotally secured to the side members of the rectangular frame 12, are agitating devices 14, which depend to the lower portion of the hopper and are arranged at opposite sides of the partition 9. These agitating devices may be formed of sheet metal presenting a plurality of flanges 15 and are adapted upon rocking of the rectangular frame 12 to discharge material from the hopper into the feed troughs 8 and prevent clogging at the discharge openings or passages 10 of the hopper 5.

Connected to each of the trunnions 13, is a transversely extending member 16, and while this transversely extending member 16 is shown in the present instance, as a channel iron, it is obvious that it may be of any desired construction.

The reference character 17 designates depending levers, and these levers are pivotally attached to opposite ends of their respective transversely extending members, as at 18. Pivotally mounted as at 19 to the opposite ends of the hopper, are transversely extending bars 20, and said bars are adapted to rock about their pivotal points. The lower end of the levers are connected, as at 21, adjacent the ends of the bars 20. Connecting the ends of the bars are perches 22 extending longitudinally of the hopper in a position adjacent the feed troughs 8 thereof.

The device functions in the following manner:

Assuming that a fowl alights upon the perch 22 at the right in Fig. 1, the bars 20 will be rocked about their pivotal point 19, and through the medium of the levers 17, the transversely extending members 16 will be rocked as shown in dotted lines. These transversely extending members 16 being rigidly connected to the trunnions 13, cause a rocking of the rectangular frame 12 within the hopper and the rocking of this frame will move the agitators 14 and thus prevent clogging of material in the contracted passages 10 of the hopper and will cause a sufficient quantity of feed to be present at all times in the feed troughs 8.

From the foregoing it is apparent that the present invention provides a feed hopper for poultry and the like, in which the fowl when feeding from the hopper operate the same to automatically fill the feed troughs and prevent a clogging of the hopper.

What is claimed is:

A chicken feeding device, comprising a hopper, a feed trough associated therewith, a rectangular frame, trunnions extending from the ends of said rectangular frame and forming means for pivotally mounting the frame in the upper portion of the hopper, a cross arm connected to each of said trunnions, levers depending from each end of said cross arms and pivotally connected thereto, perches associated with said levers whereby the rectangular frame will be rocked about its pivotal points each time a bird occupies a position on one of said perches, and agitators carried by said rectangular frame and extending downwardly into the hopper.

MARTIN BRANDT.